US008897117B2

(12) United States Patent
Park et al.

(10) Patent No.: US 8,897,117 B2
(45) Date of Patent: Nov. 25, 2014

(54) METHOD AND APPARATUS FOR MANAGING RESOURCES IN OFDMA CELLULAR SYSTEM (75) Inventors: Jeong-Ho Park, Seoul (KR); Jae-Weon Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 12/960,885

(22) Filed: Dec. 6, 2010

(65) Prior Publication Data

US 2011/0149892 A1 Jun. 23, 2011

(30) Foreign Application Priority Data

Dec. 18, 2009 (KR) ........................ 10-2009-0127467

(51) Int. Cl.
| | |
|---|---|
| H04W 4/00 | (2009.01) |
| H04J 11/00 | (2006.01) |
| H04B 7/208 | (2006.01) |
| H04L 12/28 | (2006.01) |
| H04L 5/00 | (2006.01) |
| H04W 72/04 | (2009.01) |
| H04W 48/00 | (2009.01) |
| H04W 88/06 | (2009.01) |
| H04W 48/10 | (2009.01) |

(52) U.S. Cl.
CPC ............. *H04L 5/003* (2013.01); *H04W 72/048* (2013.01); *H04W 48/00* (2013.01); *H04W 88/06* (2013.01); *H04W 48/10* (2013.01)
USPC ............ 370/203; 370/328; 370/344; 370/431

(58) Field of Classification Search
USPC ........................................................ 370/203
See application file for complete search history.

(56) References Cited

U.S. PATENT DOCUMENTS

| 8,411,623 B2 | 4/2013 | Suga |
| 2008/0310528 A1 | 12/2008 | Soong et al. |
| 2009/0219875 A1 | 9/2009 | Kwak et al. |

(Continued)

FOREIGN PATENT DOCUMENTS

| EP | 1 940 059 A1 | 7/2008 |
| JP | 2009-267986 A | 11/2009 |

(Continued)

OTHER PUBLICATIONS

"PHY Structure text for the IEEE 802.16m Amendment," IEEE C802.16m-08/1508r1, Jan. 6, 2009.

(Continued)

*Primary Examiner* — Melanie Jagannathan
(74) *Attorney, Agent, or Firm* — Jefferson IP Law, LLP (57) ABSTRACT A resource management method and apparatus in an Orthogonal Frequency Division Multiple Access (OFDMA) cellular system supporting a first system communication mode and a second system communication mode in an uplink using Frequency Division Multiplexing (FDM) are provided. A resource management apparatus provided in a Base Station (BS) or a Mobile Station (MS) subchannelizes physical resource units constituting a system bandwidth into a plurality of subchannels according a scheme defined in the first system communication mode, and renumbers the plurality of subchannels with indexes in reverse order to be used for an MS operating in the second system communication mode. The plurality of subchannels having the renumbered indexes are used for resource allocation and data exchange between the BS and the MS operating in the second system communication mode.

11 Claims, 9 Drawing Sheets (56) References Cited

U.S. PATENT DOCUMENTS

| | | | |
|---|---|---|---|
| 2009/0268685 A1 | 10/2009 | Chen et al. | |
| 2009/0270104 A1* | 10/2009 | Du et al. | 455/436 |
| 2010/0111219 A1* | 5/2010 | Wang et al. | 375/295 |
| 2011/0090879 A1* | 4/2011 | Hamiti et al. | 370/338 |
| 2011/0268053 A1* | 11/2011 | Che et al. | 370/329 |

FOREIGN PATENT DOCUMENTS

| | | | | |
|---|---|---|---|---|
| WO | 2009-023808 A1 | | 2/2009 | |
| WO | WO 2009/053943 | * | 4/2009 | |
| WO | 2009-061257 A1 | | 5/2009 | |
| WO | WO 2009/156838 | * | 12/2009 | H04W 4/20 |
| WO | 2010-002114 A2 | | 1/2010 | |

OTHER PUBLICATIONS

"IEEE 802.16m System Description Document (SDD)," IEEE 802.16m-09/0034r2, Sep. 24, 2009.

Draft Amendment to IEEE Standard for Local and Metropolitan Area Networks Part 16: Air Interface for Fixed and Mobile Broadband Wireless Access Systems; P80216m D3, IEEE Draft; P80216M_03, IEEE-SA, Dec. 9, 2009, pp. 1-676, vol. 802.016, No. D3, Piscataway, NJ, USA.

Bassiouni M.A. et al, Modeling and Evaluation of Channel Management for Real-Time Multimedia Connections in Highway Cellular Networks, Performance, Computing and Communications Conference, 1999 IEEE International, Feb. 10-12, 1999, pp. 127-133, Scottsdale, AZ, USA.

* cited by examiner

METHOD AND APPARATUS FOR MANAGING RESOURCES IN OFDMA CELLULAR SYSTEM

PRIORITY

This application claims the benefit under 35 U.S.C. §119 (a) of a Korean patent application filed in the Korean Intellectual Property Office on Dec. 18, 2009 and assigned Serial No. 10-2009-0127467, the entire disclosure of which is hereby incorporated by reference.

BACKGROUND OF THE INVENTION

1. Field of the Invention

The present invention relates to an Orthogonal Frequency Division Multiple Access (OFDMA) cellular system. More particularly, the present invention relates to a method and an apparatus for managing resources used for wireless communication.

2. Description of the Related Art

A wireless cellular communication system covers its entire service area with a plurality of Base Stations (BSs) on a division basis, and connects an air interface between each BS and each of a plurality of Mobile Stations (MSs) or Subscriber Stations (SSs) in an area of the BS, thereby providing wireless communication services to users. The air interface is connected based on wireless resources, which may be configured in a time domain, a frequency domain, or a two-dimensional time-frequency domain. More particularly, an Orthogonal Frequency Division Multiple Access (OFDMA) cellular system employs a scheme of configuring all wireless resources in a two-dimensional domain consisting of a frequency domain and a time domain, and allocating the wireless resources on a division basis according to the channel type and the user.

An Institute of Electrical and Electronics Engineers (IEEE) 802.16m system, one of the conventional OFDMA cellular systems, has a basic frame structure in which each superframe is divided into a plurality of frames and each frame is divided into a plurality of subframes. Each subframe includes a plurality of OFDMA symbols, and multiple subframes in a frame may be allocated for both or one of a Downlink (DL) transmission and an Uplink (UL) transmission, according to whether they are used in a Frequency Division Duplex (FDD) mode or a Time Division Duplex (TDD) mode.

Figure 1:
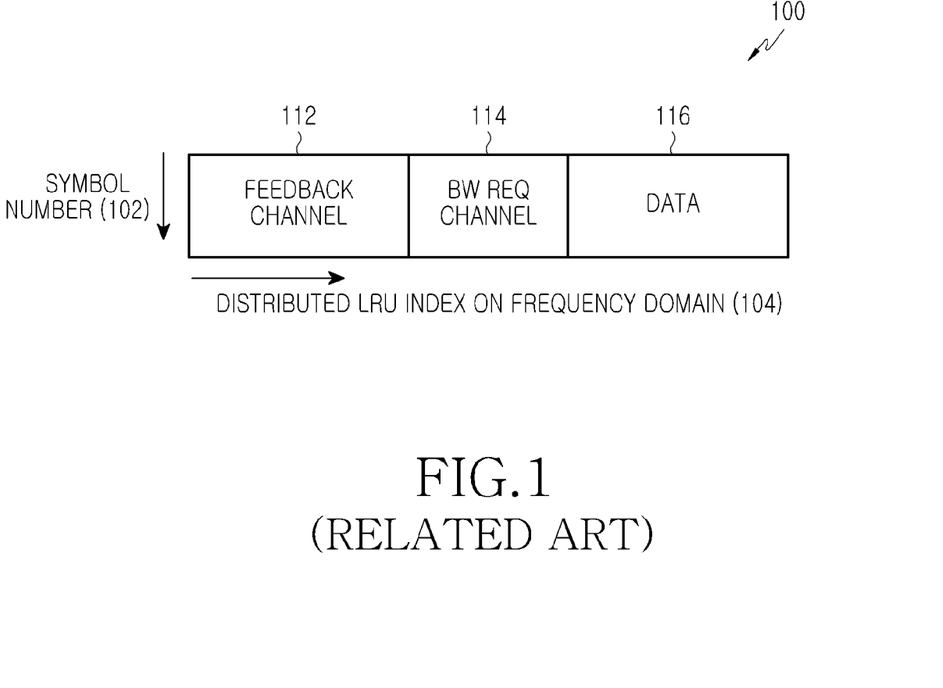
FIG. 1 is a diagram schematically illustrating a structure of an Uplink (UL) subframe used in an Orthogonal Frequency Division Multiple Access (OFDMA) cellular communication system according to an exemplary embodiment of the present invention.

FIG. 1 is a diagram schematically illustrating a structure of a UL subframe used in an OFDMA cellular communication system according to the related art.

Referring to FIG. 1, a UL subframe 100 is identified by symbol numbers 102 in the time domain and by distributed Logical Resource Unit (LRU) indexes 104 over the frequency domain. In the UL subframe 100 are first allocated feedback channels 112, such as a Primary Fast Feedback Channel (PFBCH) and a Secondary Fast Feedback Channel (SFBCH), and next allocated a BandWidth Request (BW REQ) channel 114, in the direction of the frequency domain, and the remaining region 116 is allocated for data bursts. In the data region 116 may be allocated a Ranging Channel (RNG CH) that an MS can use for network entry.

The IEEE 802.16m system supports an Advanced Air Interface (AAI) compared with an IEEE 802.16e system. In comparison, the IEEE 802.16e system is called a legacy system or a Wireless Metropolitan Area Networks (Wireless MAN) OFDMA system.

The IEEE 802.16m system should be able to ensure support of legacy systems with the IEEE 802.16e system. To this end, Time Division Multiplexing (TDM) is considered in a DL, and TDM or Frequency Division Multiplexing (FDM) is considered in a UL. However, in the UL, since use of TDM considerably reduces coverage, it is preferable to use FDM in order to ensure link budget of the UL.

When FDM is used in the UL, there is a need to balance loads of frequency resources for an advanced system and frequency resources for a legacy system according to the number and traffic usage of Advanced MSs (AMSs) existing in the system and capable of supporting IEEE 802.16m, and legacy MSs supporting only IEEE 802.16e. However, if the load balancing is flexibly performed, a signaling load may occur to notify the location of resources in use to an MS(s) having accessed the system. To minimize the signaling load, it is preferable for a signaling period not to be set short. In this case, since the MS should first get information about the location of resources used in the system, the latency of an MS's initial entry or handover process may increase in proportion to the signaling period.

Therefore, a need exists for a resource management method and apparatus for causing an advanced system and a legacy system to coexist based on FDM in an OFDMA cellular system.

SUMMARY OF THE INVENTION

An aspect of the present invention is to address at least the above-mentioned problems and/or disadvantages and to provide at least the advantages described below. Accordingly, an aspect of the present invention is to provide a resource management method and apparatus for causing an advanced system and a legacy system to coexist based on Frequency Division Multiplexing (FDM) in an Orthogonal Frequency Division Multiple Access (OFDMA) cellular system.

Another aspect of the present invention is to provide a resource management method and apparatus for preventing an increase in latency during initial network entry and signaling overhead for resources used by each system in an OFDMA cellular system.

Still another aspect of the present invention is to provide a resource management method and apparatus for ensuring the maximum flexibility of a resource utilization ratio between an advanced system and a legacy system in an OFDMA cellular system.

In accordance with an aspect of the present invention, a method for managing resources in an OFDMA cellular system is provided. The method includes subchannelizing physical resource units constituting a system bandwidth into a plurality of subchannels according to a scheme defined in a first system communication mode, to support the first system communication mode and a second system communication mode, using Frequency Division Multiplexing (FDM) on an uplink, and renumbering the plurality of subchannels with indexes in reverse order to be used for a Mobile Station (MS) operating in the second system communication mode.

In accordance with another aspect of the present invention, an apparatus for managing resources in an OFDMA cellular system is provided. The apparatus includes a controller for subchannelizing physical resource units constituting a system bandwidth into a plurality of subchannels according to a scheme defined in a first system communication mode, to support the first system communication mode and a second system communication mode, using Frequency Division Multiplexing (FDM) in an uplink, and for renumbering the plurality of subchannels with indexes in reverse order to be used in the second system communication mode, and a transceiver for transmitting or receiving resource allocation information using at least one of indexes for the renumbered subchannels under control of the controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In exemplary embodiments of the present invention, reference will be made to the Institute of Electrical and Electronics Engineers (IEEE) 802.16m and IEEE 802.16e communication standards in describing resource management in an Orthogonal Frequency Division Multiple Access (OFDMA) system. However, it will be understood by those of ordinary skill in the art that the resource management according to an exemplary embodiment of the present invention is not limited to a specific communication protocol or system configuration, and various changes in form and details may be made therein without departing from the spirit and scope of the invention. More particularly, the exemplary embodiments of the present invention are possible for a frame structure supporting two different kinds of system modes with use of Frequency Division Multiplexing (FDM).

FIGS. 1 to 10, discussed herein, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Figure 2:
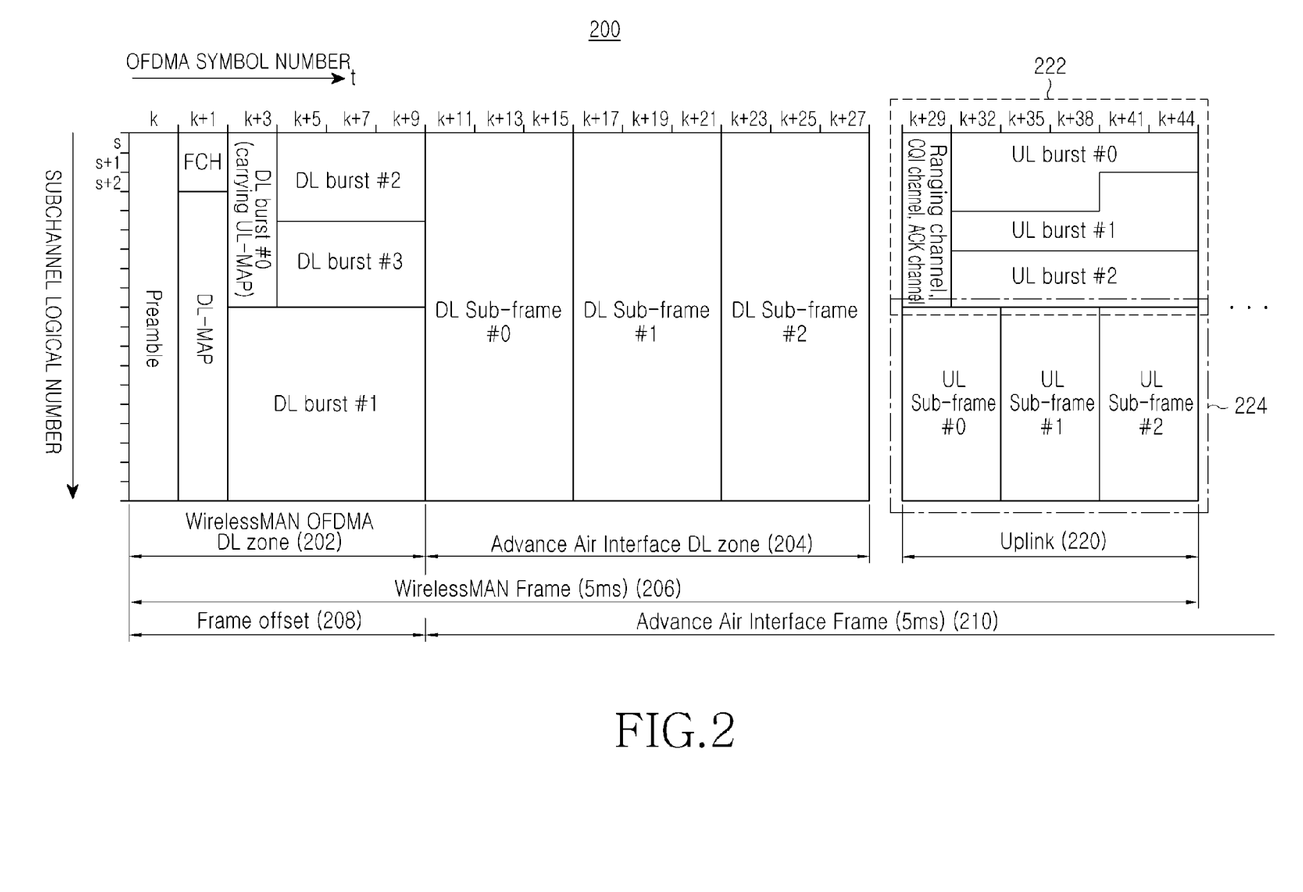
FIG. 2 is a block diagram illustrating an example of a frame structure for supporting legacy systems in an OFDMA cellular communication system according to an exemplary embodiment of the present invention.

FIG. 2 is a block diagram illustrating an example of a frame structure for legacy supporting in an OFDMA cellular communication system according to an exemplary embodiment of the present invention.

Referring to FIG. 2, Time Division Multiplexing (TDM) is used in a Downlink (DL) transmission and FDM is used in an Uplink (UL) transmission to support both an advanced system and a legacy system. The entire frame 200 is identified by Orthogonal Frequency Division Multiplexing (OFDM) symbol numbers in the time domain and by subchannel logical numbers over the frequency domain. The subchannel logical numbers are sequentially assigned to logically configured subchannels one by one, and each subchannel includes one or more subcarriers which are arranged on the frequency domain in a consecutive or distributed manner. In the time domain, the frame 200 is divided into zones 202 and 204 used for the DL, and a zone 220 used for the UL. A Wireless Metropolitan Area Network (MAN) OFDMA frame 206 for the legacy system has a length of 5 ms starting from a Wireless MAN OFDMA DL zone 202, and an Advanced Air Interface (AAI) frame 210 for the advanced system has a time-domain period corresponding to the Wireless MAN OFDMA frame 206 and a specific frame offset 208.

The DL zones 202 and 204 are classified in the time domain as the Wireless MAN OFDMA DL zone 202 for the legacy system and the AAI DL zone 204 for the advanced system. That is, in the DL, the advanced system and the legacy system are supported in a TDM manner. In the Wireless MAN OFDMA DL zone 202 exists a preamble zone, a DL-MAP message representing resource allocation in the DL zones 202 and 204, a Fundamental Channel (FCH), and a plurality of DL bursts allocable to MSs of the legacy system (i.e., legacy MSs). One of the DL bursts may carry a UL-MAP message representing resource allocation in the UL zone 220. The AAI DL zone 204 is indicated by the DL-MAP message, and includes a plurality of DL subframes allocable to MSs of the advanced system (i.e., Advanced MSs (AMSs)). Data bursts for the legacy MSs cannot be transmitted through the AAI DL zone 204 for an AAI operation, whereas data bursts for the AMSs may be allocated in any one of the Wireless MAN OFDMA DL zone 202 and the AAI DL zone 204 according to the mode, i.e., a 16e mode or a 16m mode, in which the AMSs access the BS.

The UL zone 220 is divided in the frequency domain into a first subchannel zone 222 for the legacy system and a second subchannel zone 224 for the advanced system. That is, in the UL, the advanced system and the legacy system are supported in an FDM manner. In the first subchannel zone 222 exists a control channel zone for a ranging channel, a Channel Quality Information (CQI) channel and an Acknowledgement (ACK) channel, and a plurality of UL bursts allocable to legacy MSs. The second subchannel zone 224 includes a plurality of UL subframes allocable to AMSs.

Like in the DL, data bursts for legacy MSs cannot be transmitted through the second subchannel zone 224 for an AAI operation.

In order for legacy MSs and AMSs to be allocated frequency resources in the resource zones for their associated systems, they need to identify Resource Units (RUs) in the resource zones for the associated systems. To this end, RUs in the first subchannel zone 222 and RUs in the second subchannel zone 224 are subject to independent indexing.

Figure 3:
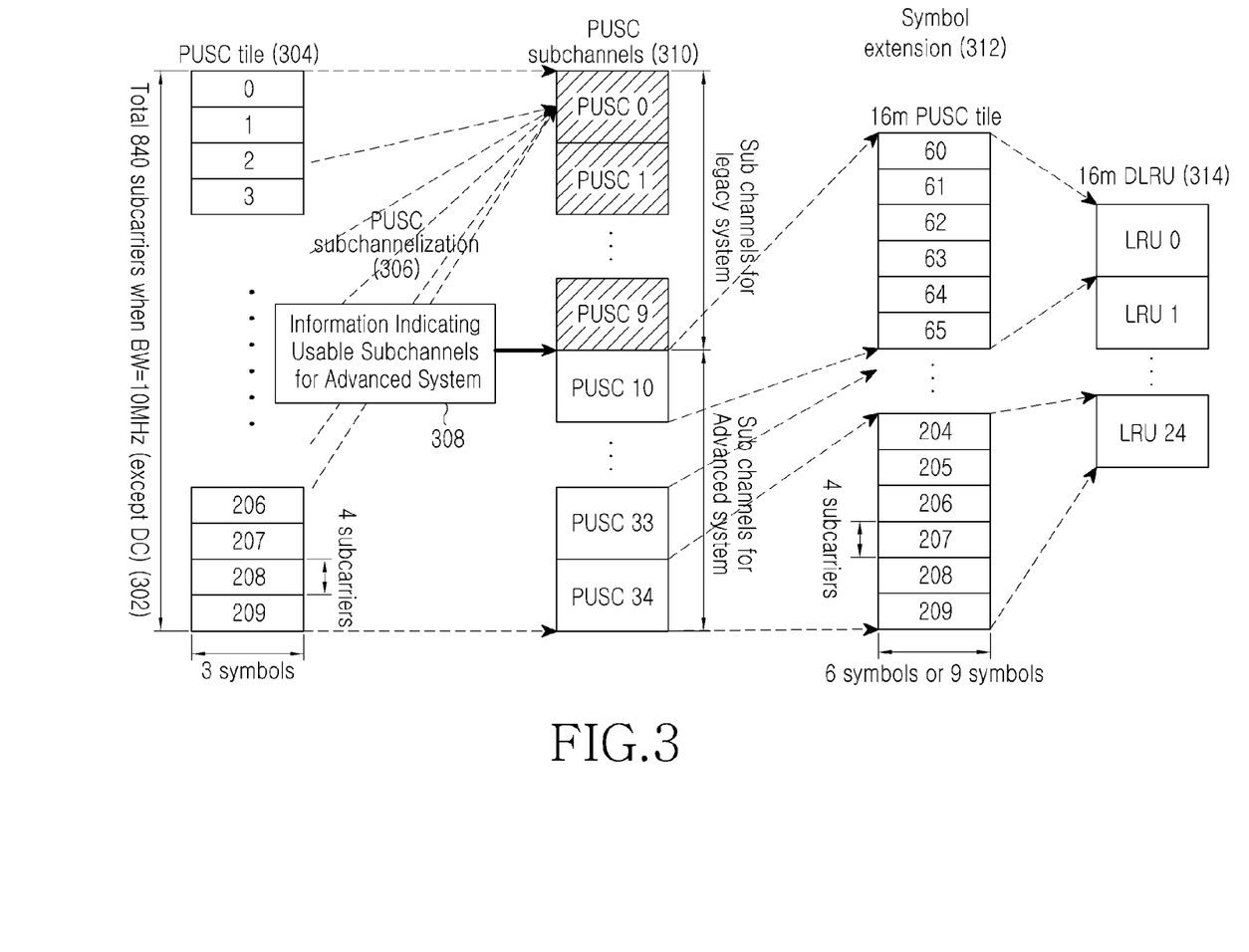
FIG. 3 is a diagram illustrating resource indexing for an advanced system according to an exemplary embodiment of the present invention.

FIG. 3 is a diagram illustrating resource indexing for an advanced system according to an exemplary embodiment of the present invention.

Referring to FIG. 3, a system bandwidth 302 is divided into a plurality of Physical Resource Units (PRUs) each including one or more subcarriers, and the PRUs are called Partial Usage SubChannel (PUSC) tiles 304. For example, if the system bandwidth 302 has a bandwidth of 10 MHz and each PUSC tile 304 includes four subcarriers and three symbols, 210 PUSC tiles 304 are formed. The PUSC tiles 304 are mapped to PUSC subchannels 310 by performing PUSC subchannelization 306. Each PUSC subchannel 310 includes, for example, six PUSC tiles which are distributed to have the same interval.

The PUSC subchannels 310 generated through the same PUSC subchannelization 306 can be used for the legacy system or the advanced system, and information 308 about usable subchannels for the advanced system is signaled to AMSs in order to allow the AMSs to recognize subchannels usable for the advanced system by themselves and determine the exact locations of resources corresponding to their indexes.

Like in the given example, if 35 PUSC subchannels 310 are generated, PUSC0 through PUSC9 are available for the legacy system and PUSC10 through PUSC34 are used for the advanced system, the PUSC subchannels available for the advanced system are defined as follows.

That is, tiles constituting PUSC10 through PUSC34 available for the advanced system are first reconfigured by symbol extension in step 312 in the time domain into extended PUSC tiles 60 through 209, each occupying a specific number of symbols, predefined according to the AAI subframe type, e.g., occupying six or nine symbols. The extended PUSC tiles 60 through 209 are mapped to a plurality of Distributed LRUs (DLRUs) DLRU0 through DLRU24, in step 314, for the advanced system. In other words, the DLRUs 314 are indexed with new numbers that start from the boundary between the frequency zone used for the legacy system and the frequency zone used for the advanced system.

When using the reconfigured DLRUs 314, AMSs need to exactly recognize subchannels corresponding to the DLRUs 314 available for the advanced system. If the subchannels are not known exactly, a fatal error may occur in scheduling and resource allocation due to the mismatch of indexes of the DLRUs 314 between the BS and the AMSs. Therefore, in the frame structure of FIG. 3, it is very important that the information 308 about the subchannels is signaled to the AMSs.

Figure 4:
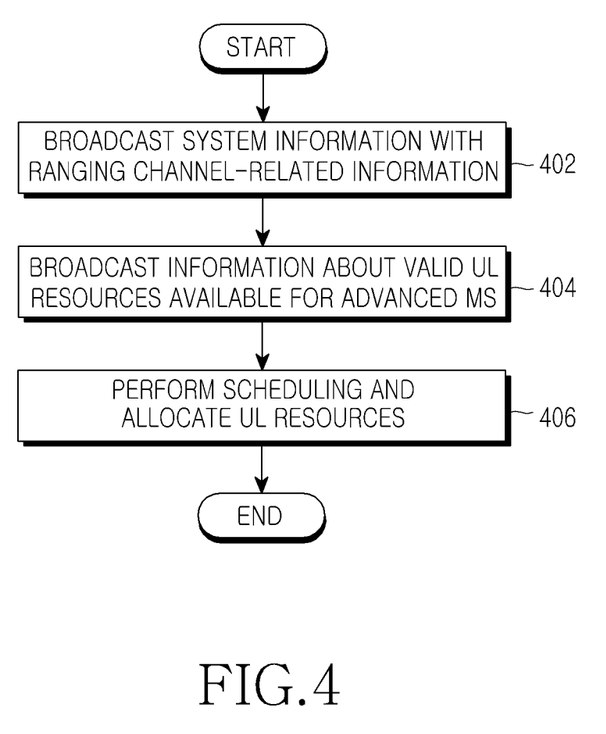
FIG. 4 is a flowchart illustrating an operation of a Base Station (BS) according to an exemplary embodiment of the present invention.

FIG. 4 is a flowchart illustrating an operation of a BS according to an exemplary embodiment of the present invention.

Referring to FIG. 4, upon deciding to start load balancing, a BS broadcasts system information including ranging channel-related information to MSs in its coverage in step 402. The ranging channel-related information may indicate, for example, at least one of DLRUs, which have been indexed with numbers starting from the boundary between the frequency zone used for the legacy system and the frequency zone used for the advanced system, as illustrated in FIG. 3. Thus, in step 404, the BS broadcasts information about valid UL resources available for the advanced system to MSs in its coverage. For example, the information about valid UL resources may be configured in a bitmap representing a subchannel zone used for the legacy system and a subchannel zone used for the advanced system, or may be configured to simply indicate the boundary between the frequency zone for the legacy system and the frequency zone for the advanced system.

In step 406, the BS performs scheduling on MSs in its coverage and allocates UL resources to the MSs using indexes of the DLRUs. For example, the BS transmits at least one DLRU index allocated to each MS using resource allocation information for the MS.

Figure 5:
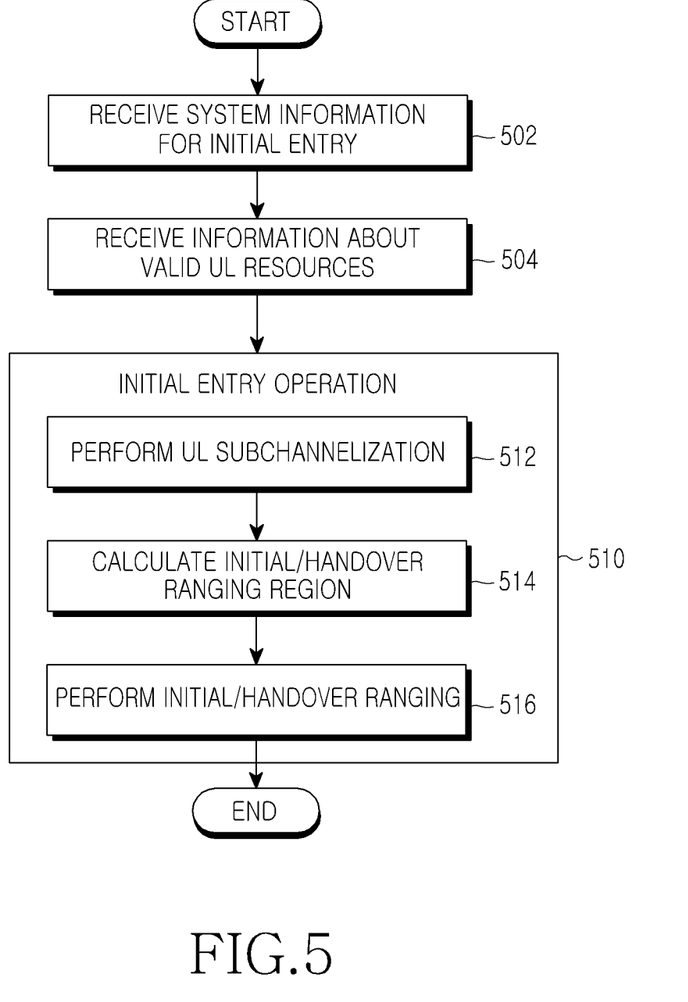
FIG. 5 is a flowchart illustrating an operation of a Mobile Station (MS) according to an exemplary embodiment of the present invention.

FIG. 5 is a flowchart illustrating an operation of an MS according to an exemplary embodiment of the present invention.

Referring to FIG. 5, an operation of an AMS accessible to the advanced system is illustrated. In step 502, an MS receives system information for initial entry from a BS, upon deciding to perform initial entry by handover as it is turned on in coverage of the BS or enters the coverage of the BS. In step 504, the MS receives information about valid UL resources available for the advanced system from the BS, and performs an initial entry operation referring to the received information in step 510. The initial entry operation will be described below.

In step 512, the MS performs the same subchannelization on the frequency zone for the legacy system and the frequency zone for the advanced system, for PUSC tiles constituting the entire system bandwidth, and checks indexes of PUSC subchannels for the advanced system based on the information received in step 504. In step 514, the MS calculates a location of a ranging region for initial entry or handover, referring to the indexes and ranging channel-related information included in the system information received in step 502. The location of a ranging region is represented by the indexes. In step 516, the MS receives information about a ranging channel in the ranging region in the calculated location, and performs initial/handover ranging using the received ranging channel information, completing its network entry.

The signaling of the information 308 causes signaling overhead, such as steps 504 and 510. In addition, in an initial network entry process, the MS should receive the information and waits until it indexes DLRUs available for the MS itself based on the received information, causing latency during initial access.

To address these and other problems and disadvantages, an exemplary embodiment of the present invention renumbers, in reverse order, PUSC subchannels available for the advanced system among the PUSC subchannels configured through PUSC subchannelization. In this case, since PUSC subchannels available for the legacy system and PUSC subchannels available for the advanced system are numbered in the opposite directions, information about subchannels usable for the advanced system is not required to be delivered to MSs. That is, the PUSC subchannels having renumbered indexes in reverse order may be used for a normal communication operation without the information about subchannels.

Figure 6:
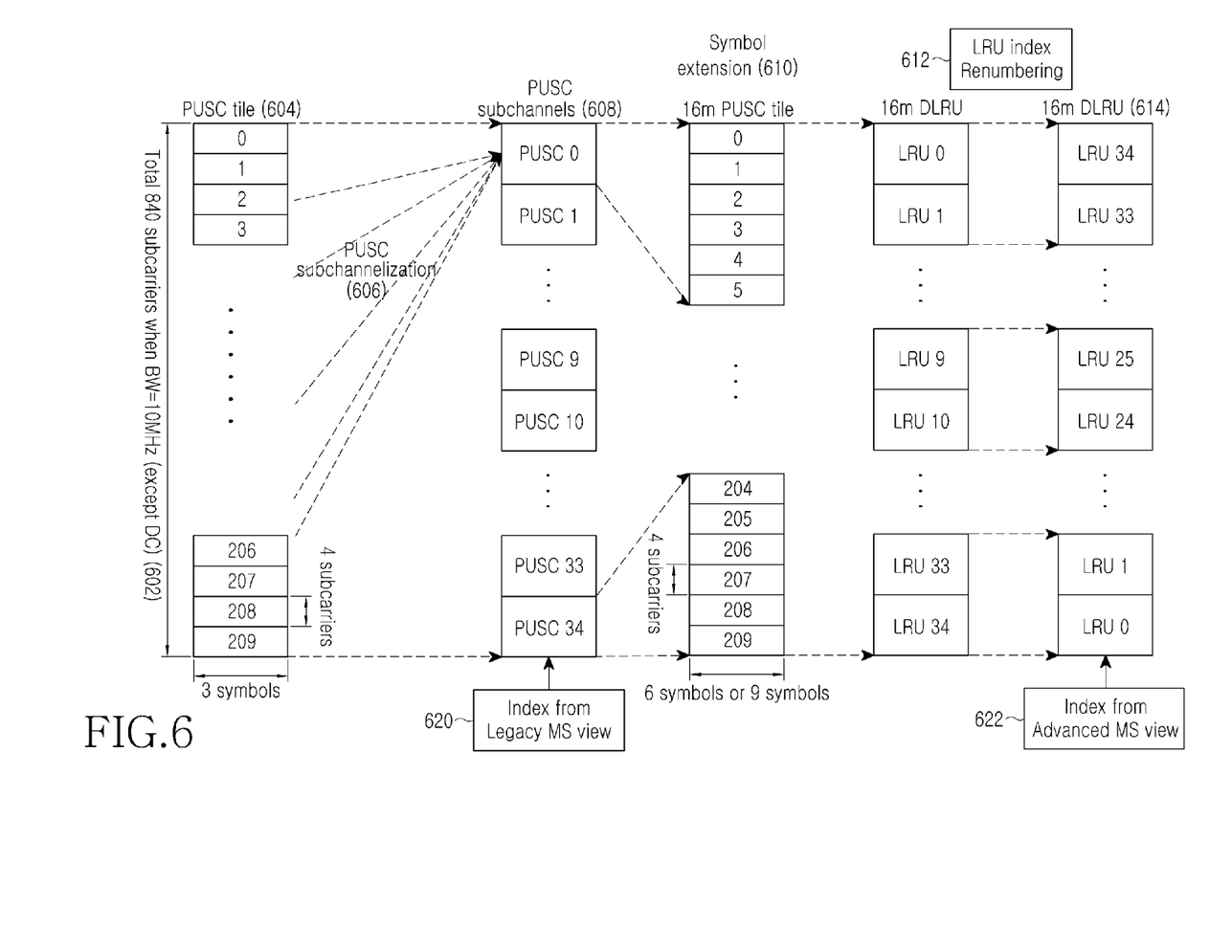
FIG. 6 is a diagram illustrating index renumbering for an advanced system according to an exemplary embodiment of the present invention.

FIG. 6 is a diagram illustrating index renumbering for an advanced system according to an exemplary embodiment of the present invention.

Referring to FIG. 6, all usable subcarriers for a system bandwidth 602 are divided into a plurality of PRUs, and the PRUs are called PUSC tiles 604. For example, if the system bandwidth 602 has a bandwidth of 10 MHz and each PUSC tile 604 includes four subcarriers and three symbols, 210 PUSC tiles 604 are formed. The PUSC tiles 604 are mapped to PUSC subchannels 608 by performing PUSC subchannelization 606. Each PUSC subchannel 608 includes, for example, six PUSC tiles distributed to have the same interval. The PUSC subchannels 608 in the system bandwidth are subchannelized by the same subchannelization scheme, and numbered starting from the first PUSC subchannel on the frequency domain. In other words, a PUSC subchannel located first on the frequency domain is PUSC0 having a first index 0, and a PUSC subchannel located last on the frequency domain is PUSC34 having a last index 34 (620). For example, an exemplary implementation includes PUSC subchannelization 606 following the subchannelization scheme defined in the legacy system.

The PUSC subchannels 608 generated through the same PUSC subchannelization 606 are available for the legacy system and the advanced system. Tiles constituting all the PUSC subchannels 608 are first reconfigured by symbol extension 610 in the time domain into extended PUSC tiles occupying a specific number of symbols, predefined according to the AAI subframe type, e.g., occupying six or nine symbols. Based on subchannels with symbol extension tiles, DLRUs for AAI are made up. The extended PUSC tiles are renumbered (612) starting from the last PUSC subchannel, i.e., renumbered reversely (in reverse order), compared with the PUSC subchannels 608 used for the legacy system, which are numbered starting from the first PUSC subchannel. In an exemplary implementation of the renumbering 612, the extended PUSC tiles are mapped to a plurality of DLRUs, and the plurality of DLRUs are renumbered in reverse order of the PUSC subchannels 608, in order to be used in the advanced system. For example, each of the DLRUs includes six PUSC tiles. That is, DLRUs 614 correspond to the results obtained by renumbering the PUSC subchannels 608. An LRU located last on the frequency domain is LRU0 having a first index 0, and an LRU located first on the frequency domain is LRU34 having a last index 34 (622).

When using the renumbered DLRUs 614, a BS and each MS do not need to know exact locations of subchannels usable for the advanced system, because indexes of the DLRUs 614 may be exactly synchronized or matched between the BS and the MS despite the unknowing of the locations of the subchannels usable for the advanced system. The BS may allocate at least one of the subchannels usable for the advanced system to each AMS through scheduling. To be sure, at this time, subchannels for the legacy system are not allocated to AMSs by the BS.

In the frame structure of FIG. 6, the information about subchannels usable for the advanced system is not required to be signaled, and besides, load balancing between the two systems may be carried out more freely. For example, since in an early phase when the advanced system is deployed, there are not many users supporting the advanced system, it is preferable to allocate a relatively large amount of frequency resources to the legacy system. However, if the number of users accessible to the advanced system increases over time, it is possible to increase the amount of frequency resources allocable to the advanced system. In this way, the frame structure of FIG. 6 contributes to significantly increase the flexibility in load balancing between the two systems without additional signaling.

Figure 7:
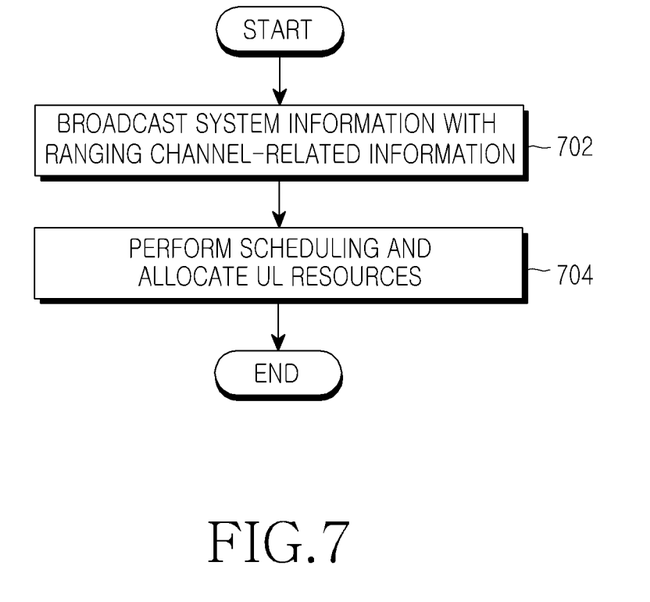
FIG. 7 is a flowchart illustrating an operation of a BS according to an exemplary embodiment of the present invention.

FIG. 7 is a flowchart illustrating an operation of a BS according to an exemplary embodiment of the present invention.

Referring to FIG. 7, upon deciding to start load balancing, a BS broadcasts system information including ranging channel-related information to MSs in its coverage in step 702. The ranging channel-related information may indicate, for example, an index for at least one of DLRUs renumbered in reverse order of the PUSC subchannels, as illustrated in FIG. 6. Compared to PUSC subchannels used for the legacy system, the DLRUs are renumbered in reverse order and there is no need for additional information to be transmitted for indexing of the DLRUs.

In step 704, the BS schedules MSs in its coverage and allocates UL resources to the MSs using the renumbered indexes of the DLRUs. For example, the BS transmits at least one DLRU index allocated to each MS using resource allocation information for the MS, and the at least one DLRU index corresponds to the renumbered index.

Figure 8:
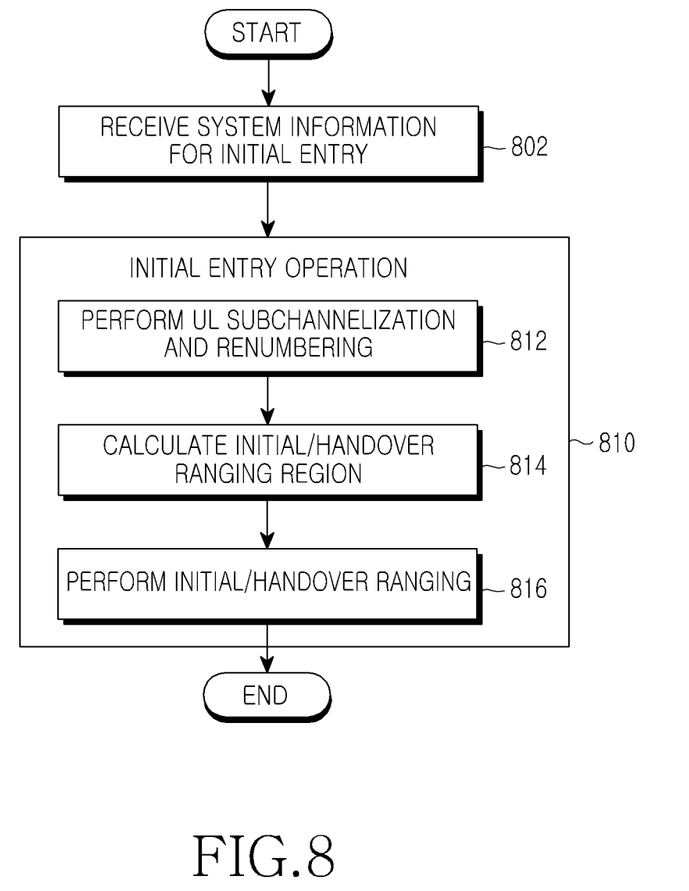
FIG. 8 is a flowchart illustrating an operation of an MS according to an exemplary embodiment of the present invention.

FIG. 8 is a flowchart illustrating an operation of an MS according to an exemplary embodiment of the present invention.

Referring to FIG. 8, an operation of an AMS accessible in an advanced system mode is illustrated. In step 802, an MS receives system information for initial entry from a BS, upon deciding to perform initial entry by handover as it is turned on in coverage of the BS or enters the coverage of the BS. In step 810, the MS performs an initial entry operation referring to the received information. The initial entry operation will be described below.

In step 812, the MS performs the same subchannelization on a frequency zone for the legacy system and a frequency zone for the advanced system, for PUSC tiles constituting the entire system bandwidth, maps PUSC subchannels configured through the subchannelization to DLRUs available for the advanced system, and then renumbers the DLRUs, compared to the PUSC subchannels.

In step 814, the MS calculates a location of a ranging region for initial entry or handover referring to indexes of the renumbered DLRUs and ranging channel-related information included in the system information received in step 802. The location of a ranging region is represented by the indexes of DLRUs.

In step 816, the MS receives information about a ranging channel in the ranging region in the calculated location, and performs initial/handover ranging using the received ranging channel information. In addition, the MS transmits the additionally required information, such as, for example, Ranging Request (RNG-REQ) and Subscriber Station (SS) Basic Capability Request (SBC-REQ), using an associated resource zone, and receives necessary response signaling. If the MS's network entry is completed in this way, the MS may transmit data traffic to the BS after scheduling and resource allocation by the BS.

The method described above may be implemented by installing a memory device and storing a relevant program code in each of the SS and the MS. That is, the BS and the MS each perform the above operation by reading out a program code stored in the memory device and executing the read program code by means of a processor or a Central Processing Unit (CPU).

Now, exemplary structures of a BS and an MS for performing the resource management operation will be described below.

Figure 9:
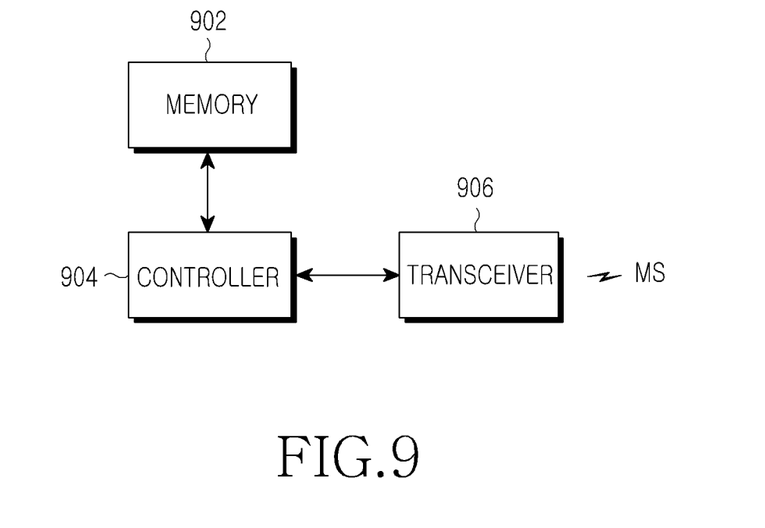
FIG. 9 is a block diagram illustrating a structure of a BS according to an exemplary embodiment of the present invention.

FIG. 9 is a block diagram illustrating a structure of a BS according to an exemplary embodiment of the present invention.

Referring to FIG. 9, a controller 904 configures PUSC subchannels by performing subchannelization on PUSC tiles in the entire system bandwidth, and renumbers the PUSC subchannels to be used for the advanced system. To this end, information necessary for the subchannelization and renumbering, such as a bandwidth of a system band and a PUSC tile structure, and the relevant program code may be stored in a memory 902, for reference by the controller 904. Meanwhile, upon detecting a need for load balancing, the controller 904 may adjust locations of control channels on resource zones according to the amount of resources for control channels necessary for the advanced system and the legacy system.

Using the indexes of the renumbered subchannels, the controller 904 generates, as information related to a ranging channel, ranging channel-related information representing a resource zone of the ranging channel. The ranging channel-related information is transmitted to the MS through a transceiver 906. Thereafter, if the initial entry operation including the MS's ranging procedure is completed, the controller 904 may allocate resources to the MS using the indexes of the renumbered subchannels, and the transceiver 906 transmits resource allocation information indicating the allocated resources to the MS, and receives UL data traffic from the MS through the allocated resources.

Figure 10:
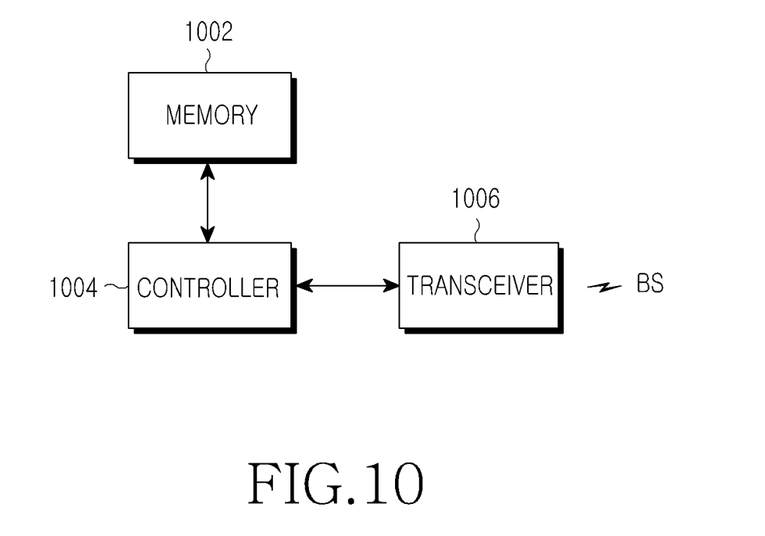
FIG. 10 is a block diagram illustrating a structure of an MS according to an exemplary embodiment of the present invention.

FIG. 10 is a block diagram illustrating a structure of an MS according to an exemplary embodiment of the present invention.

Referring to FIG. 10, when an MS is first turned on in coverage of a specific BS or has entered the coverage through handover, a controller 1004 receives system information from the BS for its initial entry, and performs an initial entry operation. For the initial entry operation, the controller 1004 configures PUSC subchannels by performing subchannelization on PUSC tiles in the entire system bandwidth, and renumbers the PUSC subchannels to be used for the advanced system.

Thereafter, the controller 1004 calculates a location of a ranging region for initial entry or handover referring to the renumbered subchannels and the received system information, and controls a transceiver 1006 to receive information about a ranging channel in the calculated location. The received ranging channel information is used in performing initial/handover ranging. If the MS's network entry is completed in this way, the controller 1004 may be allocated resources from the BS referring to the indexes of the renumbered subchannels, and the transceiver 1006 receives resource allocation information representing the allocated resources from the BS, and transmits UL data traffic to the BS through the allocated resources.

A memory 1002 may store a program code for the operation of the controller 1004, and the received system information.

As is apparent from the foregoing description, when the legacy system is supported based on FDM in a frame structure for the advanced system, LRUs for the advanced system are renumbered in a subchannelization process, thereby avoiding the need to notify MSs of the available resource boundary between the two systems. By doing so, it is possible to prevent occurrence of signaling notifying the available resource boundary between the two systems, to remove the burden that an MS should renumber subchannels for the advanced system upon a receipt of signaling, to minimize the latency during initial network entry, and to ensure the maximum flexibility of an available resource ratio between the two systems.

Also, it provisions maximum commonality between two cases of the advanced system supporting legacy system and the advanced system only, in terms of uplink control channel composition and order (along logical index ascending order, ranging channel, feedback channel, BW REQ channel exists which are followed by data channels).

While the invention has been described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for managing resources in an Orthogonal Frequency Division Multiple Access (OFDMA) cellular system, the method comprising:
    subchannelizing physical resource units constituting a system bandwidth into a plurality of subchannels according to a scheme defined in a first system communication mode, to support the first system communication mode and a second system communication mode, using Frequency Division Multiplexing (FDM) on an uplink;
    renumbering indexes of the plurality of subchannels in reverse order to be used for a Mobile Station (MS) operating in the second system communication mode;
    allocating at least one subchannel to a first MS operating in the first system communication mode based on indexes that start from a first subchannel of the plurality of subchannels; and
    allocating at least one subchannel to a second MS operating in the second system communication mode based on indexes that start from a last subchannel of the plurality of subchannels.

2. The method of claim 1, wherein the renumbering of indexes of the plurality of subchannels comprises:
    extending the physical resource units constituting the plurality of subchannels in a time domain;

mapping the extended physical resource units to logical resource units to be used in the second system communication mode; and renumbering indexes of the logical resource units in reverse order.

3. The method of claim 1, wherein the subchannels in the system bandwidth are subchannelized by the same subchannelization scheme through a frequency domain.

4. The method of claim 1, wherein the indexes of the renumbered subchannels are used to allocate a resource of a ranging channel for initial network entry of an MS operating in the second system communication mode.

5. The method of claim 1, wherein the indexes of the renumbered subchannels are used for scheduling and resource allocation for an MS operating in the second system communication mode.

6. An apparatus for managing resources in an Orthogonal Frequency Division Multiple Access (OFDMA) cellular system, the apparatus comprising:

a controller for subchannelizing physical resource units constituting a system bandwidth into a plurality of subchannels according to a scheme defined in a first system communication mode, to support the first system communication mode and a second system communication mode, using Frequency Division Multiplexing (FDM) on an uplink, and renumbering indexes of the plurality of subchannels in reverse order to be used in the second system communication mode, for allocating at least one subchannel to a first MS operating in the first system communication mode based on indexes that start from a first subchannel of the plurality of subchannels, and for allocating at least one subchannel to a second MS operating in the second system communication mode based on indexes that start from a last subchannel of the plurality of subchannels; and a transceiver for transmitting or receiving resource allocation information using at least one of the plurality of subchannels under control of the controller.

7. The apparatus of claim 6, wherein the controller extends the physical resource units constituting the plurality of subchannels in a time domain, maps the extended physical resource units to logical resource units to be used in the second system communication mode, and renumbers indexes of the logical resource units in reverse order.

8. The apparatus of claim 6, wherein the subchannels in the system bandwidth are subchannelized by the same subchannelization scheme through a frequency domain.

9. The apparatus of claim 6, wherein the controller, upon detecting a need for load balancing, adjusts locations of control channels on resource zones according to the amount of resources for control channels necessary for the second system communication mode and the first system communication mode.

10. The apparatus of claim 6, wherein the indexes of the renumbered subchannels are used to allocate a resource of a ranging channel for initial network entry of a Mobile Station (MS) operating in the second system communication mode.

11. The apparatus of claim 6, wherein the indexes of the renumbered subchannels are used for scheduling and resource allocation for an MS operating in the second system communication mode.

* * * * *